United States Patent
Tanaka

(10) Patent No.: US 8,111,910 B2
(45) Date of Patent: Feb. 7, 2012

(54) STEREOSCOPIC IMAGE PROCESSING DEVICE, METHOD, RECORDING MEDIUM AND STEREOSCOPIC IMAGING APPARATUS

(75) Inventor: Koichi Tanaka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/131,496

(22) PCT Filed: Nov. 25, 2009

(86) PCT No.: PCT/JP2009/070207
§ 371 (c)(1),
(2), (4) Date: May 26, 2011

(87) PCT Pub. No.: WO2010/061956
PCT Pub. Date: Jun. 3, 2010

(65) Prior Publication Data
US 2011/0235899 A1   Sep. 29, 2011

(30) Foreign Application Priority Data

Nov. 27, 2008  (JP) .................................. 2008-303227

(51) Int. Cl.
*G06K 9/00* (2006.01)
(52) U.S. Cl. ...................................................... 382/154
(58) Field of Classification Search ................. 382/154, 382/209, 276; 345/419–420; 348/47, 48, 348/50, 51
See application file for complete search history.

(56) References Cited

U.S. PATENT DOCUMENTS 5,937,105 A   8/1999   Katayama et al.
6,381,360 B1 *   4/2002   Sogawa ........................ 382/154
7,280,687 B2 *   10/2007   Ban et al. ....................... 382/154

FOREIGN PATENT DOCUMENTS

| DE | 695 21 739 T2 | 5/2002 |
|---|---|---|
| EP | 0 680 014 A2 | 11/1995 |
| JP | 07-294215 A | 11/1995 |
| JP | 2002-520969 A | 7/2002 |
| JP | 2003-187261 A | 7/2003 |
| JP | 2006-157432 A | 6/2006 |
| JP | 2006-285415 A | 10/2006 |
| WO | 00/04508 A1 | 1/2000 |

OTHER PUBLICATIONS

International Preliminary Report on Patentability issued in PCT/JP2009/070207, dated May 31, 2011.

* cited by examiner

*Primary Examiner* — Daniel Mariam
(74) *Attorney, Agent, or Firm* — Sughrue Mion, PLLC

(57) ABSTRACT

An apparatus (10) includes a device for acquiring a plurality of images of an identical subject taken from a plurality of viewpoints; a device for selecting a prescribed image as a reference image, selecting an image other than the reference image as a target image from among the images, and detecting feature points from the reference image and corresponding points from the target image to generate pairs of the feature point and corresponding point, wherein feature of the feature point and the corresponding point in the same pair are substantially identical; a device for estimating geometrical transformation parameters for geometrically-transforming the target image such that y-coordinate values of the feature point and the corresponding point included in the same pair are substantially identical, wherein y-direction is orthogonal to a parallax direction of the viewpoints; and a device for geometrically-transforming the target image based on the parameters.

13 Claims, 12 Drawing Sheets

SUBJECT
SUB 1

UNIT 1 UNIT 2 UNIT 3 UNIT 4 UNIT 5 UNIT 6
STEREOSCOPIC IMAGING APPARATUS
11
10

STEREOSCOPIC IMAGE PROCESSING DEVICE, METHOD, RECORDING MEDIUM AND STEREOSCOPIC IMAGING APPARATUS

TECHNICAL FIELD

The presently disclosed subject matter relates to a stereoscopic image processing device, a stereoscopic image processing method, a recording medium and a stereoscopic imaging apparatus. More particularly, the presently disclosed subject matter relates to an art geometrically correcting variations in angles of view between a plurality of images due to placement attitudes of a plurality of imaging units and variations in zoom factor and the like.

BACKGROUND ART

A camera including a plurality of imaging units in one camera apparatus (a so-called compound eye camera) can image the identical subject from a plurality of viewpoints. Thus, the compound eye camera can be used for acquiring three-dimensional information of a subject. In a field of film appreciation, there is appreciation media for a three-dimensional picture such as a print which is made by using images acquired from the respective imaging units and having parallaxes, and is implemented by using a lenticular lens sheet. The compound eye camera is used as an image input device for the media.

As described above, the compound eye camera includes the plurality of imaging units. Accordingly, favorable parallax images cannot be acquired under a condition in which there are variations in characteristics of a lens, an imaging element or the like of each imaging unit or variations in the placement attitude on an imaging unit-by-imaging unit basis when mounting the imaging units. In particular, the latter variations greatly influence the parallax information. Thus, it is important to reduce the variations in placement attitudes of the imaging units for the sake of prevention of degrading a stereoscopic effect and viewability of the three-dimensional image.

When a subject (person) SUB2 is imaged by two imaging units (left and right) as shown in FIG. 12A, it is difficult to acquire ideal parallax images. The ideal parallax images $IMG_L$ and $IMG_R$ are imaged under a condition without variations in the attitude of the imaging units in the camera, and between the ideal parallax images $IMG_L$ and $IMG_R$, the image $SUB2_L$ of the subjects SUB in the image $IMG_L$ imaged by the left imaging unit and the image $SUB2_R$ of the subject SUB2 in the image $IMG_R$ imaged by the right imaging unit are displaced each other toward a horizontal direction of the images $IMG_L$ and $IMG_R$, the displacement being due to the parallax, as shown in FIG. 12B. In actually-acquired parallax images $IMG_L'$ and $IMG_R'$, the image $SUB2_L'$ and $SUB2_R'$ of the subject SUB2 in the images $IMG_L'$ and $IMG_R'$ are displaced due not only to parallax, but also to the attitudes of the imaging units (FIG. 12C).

In a process of manufacturing the compound eye camera, it is preferable that the imaging units are mounted with high location precision so as to eliminate the above-mentioned displacement of the image of the subject due to the variations of the attitudes of the imaging units. However, the pursuit of precision causes problems of reduction in productivity, increase in operation worker-hour and the like.

In order to solve the above described problems, conventionally, PTL 1 and PTL 2 suggest methods which eliminate a difference in geometrical characteristics between the imaging units by geometrically transforming images taken by the compound eye camera.

In a method described in PTL 1, in order to correct projective distortions caused by displacement in positions and attitudes of the plurality of cameras, images taken by the respective cameras are projected on the same (single, identical) plane, and the images taken by the respective cameras are corrected to be the images on the same plane.

A method described in PTL 2 is suggested to correct deviations caused by differences in attitudes and zoom factors of the imaging units among deviations in angles of view which arise when two imaging units simultaneously take images of a subject. In the method described in PTL 2, corresponding points between images acquired by the respective imaging units are detected, calculates a geometrical correction parameter such that the corresponding points of respective images are identical to each other, and transforms the images using the parameter.

Citation List

Patent Literature
PTL 1: Japanese Patent Application Laid-Open No. 7-294215
PTL 2: Japanese Patent Application Laid-Open No. 2006-157432

SUMMARY OF INVENTION

Technical Problem

However, in the method described in PTL 1, image processing that forcedly projects the individual images on the identical plane is performed. Therefore, the method described in PTL 1 has a problem that the parallax between the images after projection becomes inappropriate and out of intention.

On the other hand, since in the method described in PTL 2, the images are transformed such that the corresponding points in the two images are identical to each other. The method described in PTL2 has a problem that the displacement of the image of the subject between the parallax images due to a parallax to be left is also corrected, and information on the parallax is lost.

The presently disclosed subject matter is made in view of these situations. It is an object of the presently disclosed subject matter to provide a stereoscopic image processing device, a stereoscopic image processing method, a recording medium and a stereoscopic imaging apparatus which, when eliminating variations in views of angle between a plurality of images due to variations in placement attitudes, zoom factors and the like of a plurality of imaging units which take the plurality of images by a geometrical transformation, can geometrically transform the images so as to leave the intrinsical deviation of view of angle to between the images, can acquire ideal parallax images.

Solution to Problem

In order to achieve the above-mentioned object, a stereoscopic image processing device concerning a first aspect of the presently disclosed subject matter, includes an image acquisition device for acquiring a plurality of images of an identical subject taken from a plurality of viewpoints; a corresponding point detection device for selecting a prescribed image as a reference image from among the acquired plurality of images, selecting an image other than the reference image as a target image from among the acquired plurality of images, and detecting a plurality of feature points from the reference image and a plurality of corresponding points from the target image to generate a plurality of pairs of the feature point and corresponding point, wherein feature of the feature point and the corresponding point included in the same pair are substantially identical to each other; a parameter estimation device for estimating geometrical transformation parameters for geometrically transforming the target image such that y coordinate values of the feature point and the corresponding point included in the same pair are substantially identical to each other, wherein y direction is orthogonal to a parallax direction of the plurality of viewpoints; and an image transformation device for geometrically transforming the target image on the basis of the estimated geometrical transformation parameters.

In the first aspect of the presently disclosed subject matter, the geometrical transformation parameters for geometrically transforming the target image are estimated under a constraint that a component along a direction orthogonal to a parallax direction of the plurality of viewpoints be substantially zero with respect to each displacement between the feature points of a prescribed image (reference image) among the plurality of images of the identical subject taken from the plurality of viewpoints and the corresponding points of the target image other than the reference image. More specifically, the apparatus of the first aspect estimates the geometrical transformation parameter for geometrically transforming the target image such that only the y coordinate values of the feature point and the transformed corresponding points are substantially identical to each other. Geometrical transformation based on the thus estimated geometrical transformation parameter can correct a displacement in an angle of view along the direction orthogonal to the parallax direction, while remaining an intrinsically displacement in the angle of view to between the reference image and the target image, thereby allowing ideal parallax images to be acquired.

A second aspect of the presently disclosed subject matter provides a stereoscopic image processing device according to the first aspect, wherein the parameter estimation device estimates at least some parameters in the geometrical transformation parameters based on at least the x and y coordinate values of the corresponding points and the y coordinate values of the feature points.

A third aspect of the presently disclosed subject matter provides a stereoscopic image processing device according to the second aspect, wherein the parameter estimation device calculates parameters other than said some parameters estimated by the parameter estimation device based on said some parameters.

More specifically, there are a case where all the parameters can be estimated using the x and y coordinate values of the corresponding points and the y coordinate values of the feature points, and a case where some of the parameters, not all the parameters can be estimated, depending on the types of transformation equations for performing the geometrical transformation. However, even in the latter case, the parameter other than said some parameters can be calculated based on said some parameters.

A fourth aspect of the presently disclosed subject matter provides a stereoscopic image processing device according to the second aspect, wherein the geometrical transformation parameters are a projective transformation parameters, and the parameter estimation device selects five or more pairs from among the plurality of pairs of the feature point and the corresponding point, and estimates parameters for determining y coordinate values of projective-transformed corresponding points on the basis of the coordinate values the feature point and the corresponding point of each of the selected pairs.

A fifth aspect of the presently disclosed subject matter provides a stereoscopic image processing device according to the fourth aspect, wherein the parameter estimation device calculates the other parameters required to determine the x coordinate values of the projective-transformed corresponding points on the basis of the parameters for determining y coordinate values of projective-transformed corresponding points.

More specifically, when the geometrical transformation is performed by the projective transformation, only some of the parameters (parameters for at least determining the y coordinate values of the projective-transformed corresponding points) can be estimated among the projective transformation parameters on the basis of the x and y coordinate values of the corresponding points the y coordinate values of the feature points with respect to five or more pairs. However, parameters other than said some parameters (parameters required to determine the x value of the projective-transformed corresponding points) can be calculated on the basis of the estimated parameters.

A sixth aspect of the presently disclosed subject matter provides a stereoscopic image processing device according to the second aspect, wherein the geometrical transformation parameters are Helmert transformation parameters, and the parameter estimation device selects three or more pairs from among the detected plurality of pairs of the feature point and the corresponding point, and estimates the Helmert transformation parameters on the basis of the coordinate values of the feature points and the corresponding points of each of the selected pairs.

More specifically, when the geometrical transformation on the image is performed by the Helmert transformation, all of Helmert transformation parameters can be estimated on the basis of the x and y coordinate values of the corresponding points and the y coordinate values of the feature points with respect to at least three pairs.

A stereoscopic image processing method concerning a seventh aspect of the presently disclosed subject matter includes an image acquisition step of acquiring a plurality of images of an identical subject taken from a plurality of viewpoints; a corresponding point detection step of selecting a prescribed image as a reference image from among the acquired plurality of images, selecting an image other than the reference image as a target image from among the acquired plurality of images, and detecting a plurality of feature points from the reference image and a plurality of corresponding points from the target image to generate a plurality of pairs of the feature point and corresponding point, wherein feature of the feature point and the corresponding point included in the same pair are substantially identical to each other; a parameter estimation step of estimating geometrical transformation parameters for geometrically transforming the target image such that y coordinate values of the feature points and the corresponding points included in the same pair are substantially identical to each other, wherein y direction is orthogonal to a parallax direction of the plurality of viewpoints; and an image transformation step of geometrically transforming the target image on the basis of the estimated geometrical transformation parameters.

A eighth aspect of the presently disclosed subject matter provides a stereoscopic image processing method according to the seventh aspect, wherein, in the parameter estimation step, at least some parameters in the geometrical transformation parameters are estimated based on at least the x and y coordinate values of the corresponding points and the y coordinate values of the feature points.

A ninth aspect of the presently disclosed subject matter provides a stereoscopic image processing method according to the eighth aspect, wherein the parameter estimation step includes: a first step of randomly selecting a certain number of pairs required to estimate the geometrical transformation parameters for determining y coordinate values of the transformed corresponding points from among N pairs, provided that a total number of plurality of pairs is N; a second step of calculating the y coordinate values of the transformed corresponding points with respect to each of the N pairs based on the parameter estimated on the basis of the coordinate values of each corresponding point randomly selected by the first step; a third step of calculating a difference between the y coordinate value of the transformed corresponding point calculated by the second step and the y coordinate value of the feature point for each of the N pairs; a fourth step of counting a number of pairs of the feature point and the corresponding point whose difference calculated by the third step is less than a predetermined first threshold; a fifth step of determining a confidence level of the estimated parameter on the basis of a ratio between the counted number of pairs and the N; and a step of iterating the first to fifth steps until the determined confidence level reaches a predetermined confidence level, or the number of iterations reaches a predetermined number of iterations.

According to the ninth aspect of the presently disclosed subject matter, an appropriate combination can be determined from among the N pairs as the certain number of pairs (five pairs for the projective transformation, and three pairs for the Helmert transformation) required to estimate the parameters for at least determining the y coordinate values of the transformed corresponding points. More specifically, the certain number of pairs required to estimate the parameter from among the N pairs are randomly selected. The y coordinate value of the transformed corresponding point is calculated with respect to each of the N pairs based on the estimated parameter on the basis of the coordinate value of each corresponding point of the selected pairs. The difference between the calculated y coordinate value of the transformed corresponding point and the y coordinate value of the feature point is calculated with respect to each of the N pairs. The number of pairs of the feature point and the corresponding point whose calculated difference is less than the first threshold is counted. The confidence level of the estimated parameter is determined on the basis of the ratio of the number of counted pairs and the N. The processes including the random selection of pairs and the like are iterated until the determined result of the estimated parameter reaches the predetermined confidence level or the number of iterations reaches the predetermined number of iterations. Thus, the appropriate combination can be determined as the certain number of pairs required to estimate the parameter for at least determining the y coordinate value after transformation.

A tenth aspect of the presently disclosed subject matter provides a stereoscopic image processing method according to the ninth aspect, wherein the parameter estimation step includes: a sixth step of calculating the y coordinate value of the transformed corresponding point for each of the N pairs based on the estimated parameter when the determined confidence level reaches the predetermined confidence level or the estimated parameter when the confidence level is highest among the levels at the respective iterations; a seventh step of calculating a difference between the y coordinate value of the transformed corresponding point calculated by the sixth step and the y coordinate value of the feature point for each of the N pairs; an eighth step of selecting only the pairs of the feature point and the corresponding point whose difference calculated by the seventh step is less than a predetermined second threshold from the N pairs; and a ninth step of calculating the plurality of parameters using only the pairs of the feature point and the corresponding point selected in the eighth step.

More specifically, the estimated parameters have a desired confidence level. The y coordinate value of the transformed corresponding point transformed by this parameters and the y coordinate value of the feature point should intrinsically be substantially identical, and the difference thereof is less than the predetermine second threshold. On the other hand, the pair of the feature point and the corresponding point whose difference is less than the second threshold regarded as inappropriate pair and eliminated. Only the pair of corresponding points whose difference is less than the second threshold is extracted. The plurality of parameters are then calculated again based on the pair thus extracted, thereby allowing the confidence level of the parameter to further increase.

A eleventh aspect of the presently disclosed subject matter provides a stereoscopic image processing method according to the tenth aspect, wherein, in the ninth step, the plurality of parameters which minimize a square sum of differences between the y coordinate values of the transformed corresponding points in the plurality of pairs selected by the eighth step and the y coordinate values of the feature points. In other words, the plurality of final parameter is estimated by the least squares method.

A recording medium concerning a twelfth aspect of the presently disclosed subject matter includes a computer program causing a computer to execute a process for a stereoscopic image processing, the process including: acquiring a plurality of images of an identical subject taken from a plurality of viewpoints; selecting a prescribed image as a reference image from among the acquired plurality of images, selecting an image other than the reference image as a target image from among the acquired plurality of images, and detecting a plurality of feature points from the reference image and a plurality of corresponding points from the target image to generate a plurality of pairs of the feature points and corresponding points, wherein features of the feature points and the corresponding points included in the same pair are substantially identical to the feature points respectively; estimating geometrical transformation parameters for geometrically transforming the target image such that y coordinate values of the feature points and the corresponding points included in the same pair are substantially identical to each other, wherein y direction is orthogonal to a parallax direction of the plurality of viewpoints; and geometrically transforming the target image on the basis of the estimated geometrical transformation parameters.

A stereoscopic imaging apparatus concerning a thirteenth aspect of the presently disclosed subject matter includes a stereoscopic image processing device according to any one of the first to the fifth aspect; and a plurality of imaging units which are disposed at a plurality of viewpoints along the parallax direction respectively, and take images of the identical subject from their viewpoints, wherein the image acquisition device acquires the plurality of images taken by the plurality of imaging units, respectively.

The above described aspects of the presently disclosed subject matter may be provided as a stereoscopic image processing program which causes an apparatus such as a computer or a processing unit (CPU) in a camera, an image reproduction apparatus or a printer to execute the above described procedures. Also, the above aspects of the presently disclosed subject matter may be provided as a computer program product in a computer-readable recording medium for use in controlling the apparatus.

Advantageous Effects of Invention

The above described aspects of the presently disclosed subject matter estimates the geometrical transformation parameter for geometrically transforming a target image under a constraint making the component along the direction orthogonal to the parallax direction which depends on the positional relationship between the plurality of viewpoints be about substantially zero with respect to the displacements between the feature points on the prescribed image (reference image) among the plurality of images of the identical subject taken from the plurality of viewpoints and the respective corresponding points on the image (the target image) other than the reference image among the plurality of images. Accordingly, the aspects of the presently disclosed subject matter can correct the deviation in angle of view along the direction orthogonal to the parallax direction, while leaving the deviation in angle of view which intrinsically arises along the parallax direction. Thus, the ideal parallax images can be acquired.

DESCRIPTION OF EMBODIMENTS

A stereoscopic image processing device, a stereoscopic image processing method, a recording medium and a stereoscopic imaging apparatus according to embodiments of the presently disclosed subject matter will hereinafter be described with reference to the accompanying drawings.

[Overall Configuration of Stereoscopic Imaging Apparatus]

Figure 1:
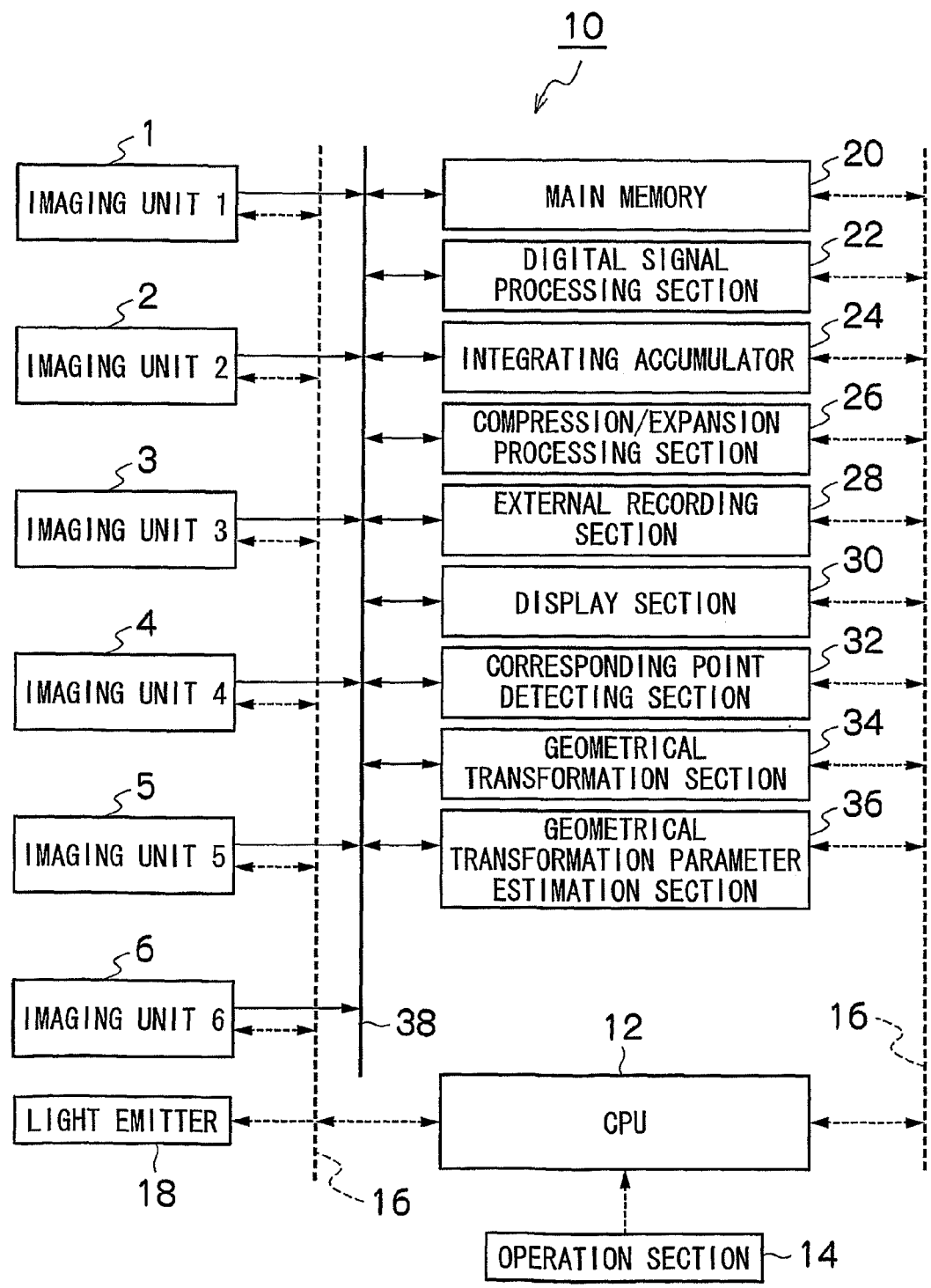
FIG. 1 is a block diagram illustrating a construction of an embodiment of a stereoscopic imaging apparatus.

FIG. 1 is a block diagram illustrating a construction of an embodiment of a stereoscopic imaging apparatus of the presently disclosed subject matter.

As shown in FIG. 1, the stereoscopic imaging apparatus 10 includes six imaging units 1 to 6. The stereoscopic imaging apparatus 10 acquires six images (parallax images) by taking the identical subject from six viewpoints, and records the images as image data for recording in a prescribed format.

To a central processing unit (CPU 12), the imaging units 1 to 6 and a light emitter 18 are connected via a control bus 16. A main memory 20, a digital signal processing section 22, an integrating accumulator 24, a compression/expansion processing section 26, an external recording section 28, a display section 30, a corresponding point detecting section 32, a geometrical transformation section 34, and a geometrical transformation parameter estimation section 36 are also connected to the CPU 12. The CPU 12 controls the operation of the stereoscopic imaging apparatus 10 on the basis of an input operation from the operation section 14 according to a prescribed control program.

The imaging units 1 to 6, the main memory 20, the digital signal processing section 22, the integrating accumulator 24, the compression/expansion processing section 26, the external recording section 28, the display section 30, the corresponding point detecting section 32, the geometrical transformation section 34, and the geometrical transformation parameter estimation section 36 are connected to each other via a data bus 38.

Figure 2:
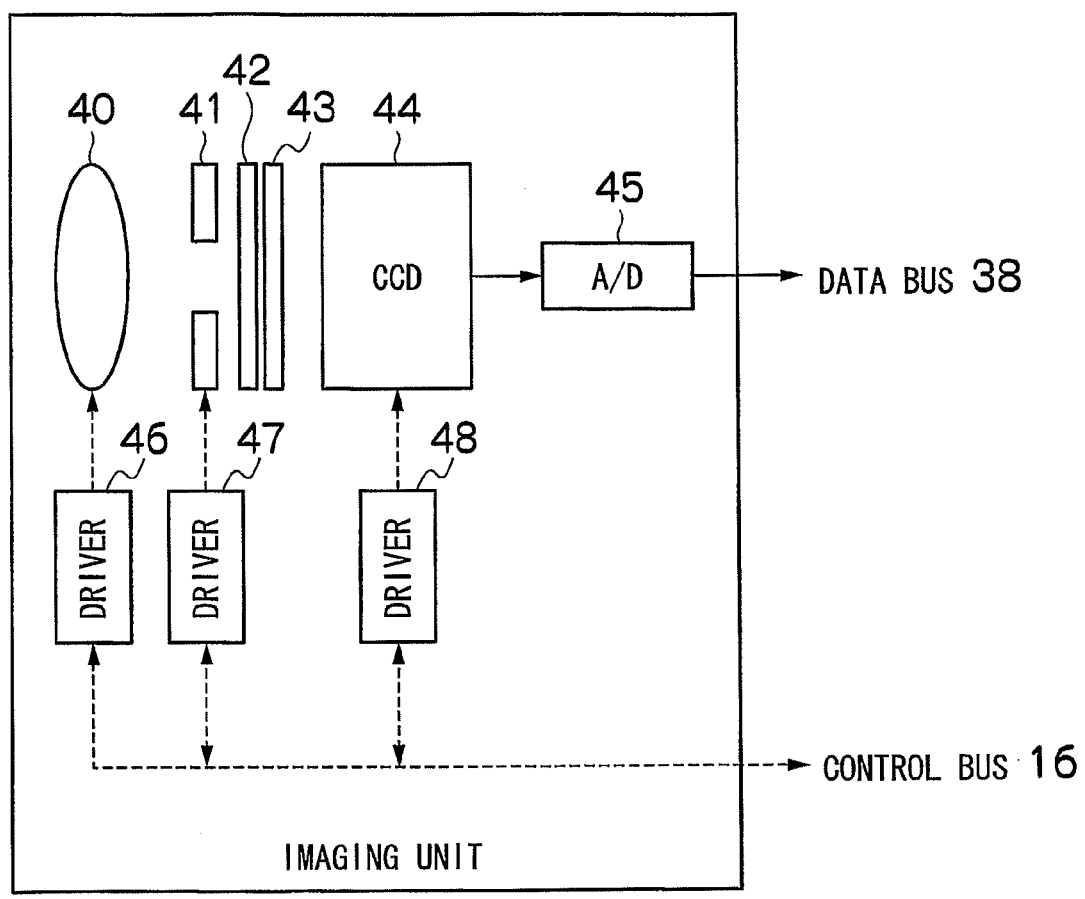
FIG. 2 is a block diagram illustrating a construction of an imaging unit shown in FIG. 1.

The constructions of the imaging units 1 to 6 are the same as each other. As shown in FIG. 2, each of the imaging units 1 to 6 includes an imaging lens 40, a diaphragm 41, an IR (infrared) cut filter 42, an optical low-pass filter 43, an imaging element (CCD (charge coupled device) 44), an A/D convertor 45, a lens driver 46, a diaphragm driver 47, and a CCD driver 48.

The imaging lens 40 includes a focusing lens, a zoom lens, is driven by the lens driver 46 and moves back and forth along an optical axis thereof. The CPU 12 controls the position of the focusing lens to adjust the focus to be on a subject by controlling the lens driver 46. The CPU 12 controls a zooming by controlling the position of the zoom lens according to a zoom instruction from the operation section 14.

The diaphragm 41 includes, for instance, an iris diaphragm. The diaphragm 41 is driven by the diaphragm driver 47. The CPU 12 controls the amount of aperture (aperture value) of the diaphragm 41 via the diaphragm driver 47, and controls the amount of incident light into the CCD 44.

The CCD 44 is a two-dimensional color CCD solid-state imaging element. The CCD 44 includes multiple photodiodes which are two-dimensionally arranged on a photo-receptive surface of the CCD 44, and color filters (for example, R (Red), G (Green) and B (Blue) filters) which are disposed on the respective photodiodes in a prescribed arrangement. An optical image formed on the photo-receptive surface of the CCD 44 via the imaging lens 40, the diaphragm 41, the IR cut filter 42 and the optical low-pass filter 43 is converted into signal charges corresponding to the amount of incident light by these photodiodes. The signal charges accumulated in the respective photodiodes are successively read out from the CCD 44 as voltage signals (R, G and B image signals) corresponding to the amount of the signal charges on the basis of drive pulses provided from the CCD driver 48 according to an instruction by the CPU 12. The CCD 44 is provided with an electronic shutter function. The CPU 12 controls a charge accumulating time during which a charge is accumulated into the photodiodes by the electronic shutter function. That is, the CPU 12 controls an exposure time or a shutter speed by the electronic shutter function. Although the CCD 44 is used as the imaging element in this embodiment, an imaging element having another configuration such as a CMOS (complementary metal-oxide semiconductor) sensor and the like can be used.

The image signal read out from the CCD 44 is converted into a digital signal by the A/D convertor 45. Subsequently, the digital signal (image data) is temporarily stored in the main memory 20 via the data bus 38.

Figure 3:
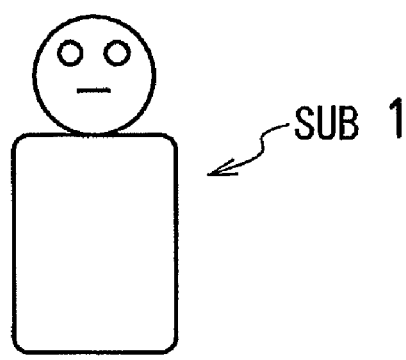
FIG. 3 is a diagram illustrating a positional relationship between a disposition of a plurality of imaging units (six imaging units) in an apparatus body of the stereoscopic imaging apparatus and a subject.
Figure 3:
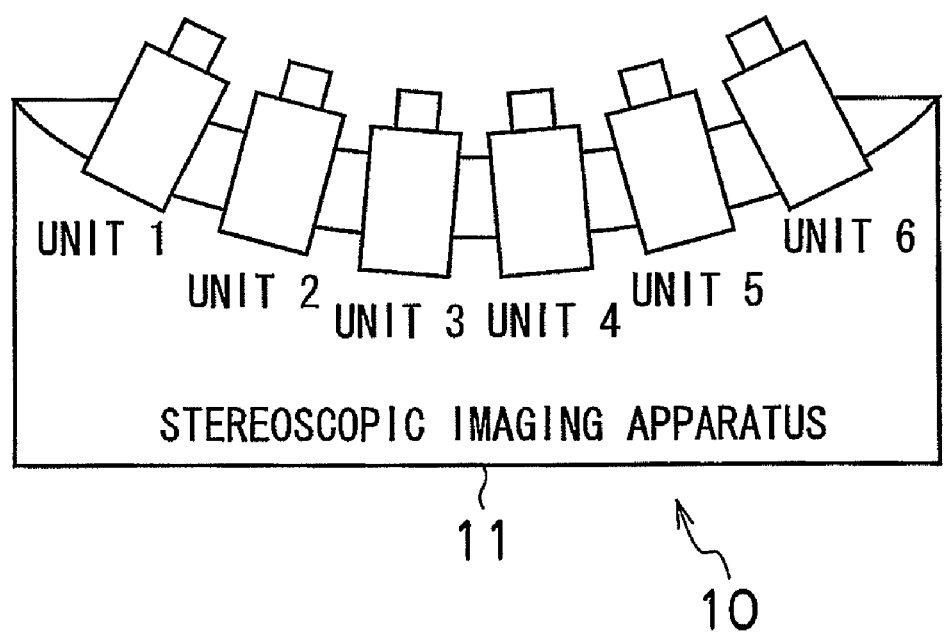

As shown in FIG. 3, the imaging units 1 to 6 are disposed along a horizontal direction to a main body 11 of the stereoscopic imaging apparatus 10 at prescribed intervals (prescribed base line lengths). The imaging units 1 to 6 are disposed so as to adjust convergent angles (angles between optical axes of the imaging units) of the imaging units 1 to 6 such that the optical axes of the imaging lenses of the respective imaging units 1 to 6 intersect at a single point.

The CPU 12 drives the imaging units 1 to 6 in synchronism with each other. More specifically, the CPU 12 always adjusts focus of each imaging lens 40 included in imaging units 1 to 6 so that the identical subject comes into focus. The imaging units 1 to 6 are always set to have the same focal length (zoom factor). Furthermore, the CPU 12 adjusts the diaphragm 41 so that each CCD 44 included in the imaging units 1 to 6 always obtain the same amount of incident light (aperture value).

The operation section 14 includes devices for receiving the user input such as a shutter button, a power switch, a mode dial, a cross button, a zoom button. The shutter button is pressed in two stages, which is put into so-called "half-pressing state" in which the shutter button is pressed halfway (half-pressed) and so-called "full-press state" in which the shutter button is fully pressed. In an image-taking mode, when the shutter button is pressed halfway, an image-taking preparation process (for example, Automatic Exposure process (AE), Automatic Focus adjustment process (AF) and/or Automatic White Balance correction process (AWB) is performed. In an image-taking mode, when the shutter button is fully-pressed, an image-taking and recording process is performed.

The light emitter 18 includes, for instance, a discharge tube (xenon tube). The light emitter 18 emits light, if necessary, for instance, when taking an image of a dark subject, or taking an image in a back light situation.

The main memory 20 is used as a working area when the CPU 12 executes a program, and as a storage section for temporarily storing digital image signals acquired by imaging by the imaging units 1 to 6.

The digital signal processing section 22 includes a white balance adjustment circuit, a gradation transformation circuit (e.g. gamma correction circuit), a color-interpolating circuit (a processing circuit for obtaining color signals corresponding to colors other than a color of the color filter disposed on a pixel by interpolating the color signals obtained from the neighboring pixels, and obtaining the RGB color signals for each pixel position.), a contour correction circuit, a brightness/color-difference signal generating circuit. The digital signal processing section 22 performs a prescribed signal processing on the R, G and B image data stored in the main memory 20. More specifically, the R, G and B image signals are converted by the digital signal processing section 22 into YUV signals including brightness signals (Y signals) and color-difference signals (Cr and Cb signals), and subjected to prescribed processes such as the gradation transformation process (e.g. gamma correction). The image signal processed by the digital signal processing section 22 is stored in the main memory 20.

The integrating accumulator 24 calculates a focus evaluation value used for the automatic focus adjustment process on the basis of an image signal taken when the shutter button is pressed halfway. Also, the integrating accumulator 24 calculates brightness of the subject required for the automatic exposure process. In the automatic focus adjustment process, the CPU 12 searches for a position where the focus evaluation value calculated by the integrating accumulator 24 becomes a local-maximum. The CPU 12 makes the focusing lens move to that position, and focuses on an image of the subject (a main subject). In the automatic exposure process, the CPU 12 performs exposure setting for obtaining an appropriate exposure amount on the basis of the brightness of the subject calculated by the integrating accumulator 24. More specifically, the CPU 12 sets image-taking sensitivity, the aperture value and the shutter speed, and judges a necessity of firing a flush (the light emitter 18).

The compression/expansion processing section 26 performs a compression process on the inputted image data and generates compressed image data in a prescribed format according to an instruction from the CPU 12. For instance, a still image is subjected to a compression process conforming to the JPEG standard, and a moving image is subjected to a compression process conforming to the MPEG2, MPEG4 or H.264 standard. The compression/expansion processing section 26 also performs a expansion process on inputted compressed image data and generates uncompressed image data according to an instruction from the CPU 12.

The external recording section 28 records the image file containing the image data in the JPEG format or the like generated by the compression/expansion processing section 26 into a detachable external recording medium such as a memory card. Also, the external recording section 28 reads the image file from the external recording medium.

The display section 30 includes, for instance, a color liquid crystal panel. The display section 30 displays an image having been taken by the stereoscopic imaging apparatus 10, and is used as a GUI (Graphical User Interface) for various settings. The display section 30 is also used as an electronic view finder for a user to confirm the angle of view in an image-taking mode. The display section 30 includes a lenticular lens including a group of semi-cylindrical lenses which is disposed on a surface of the color liquid crystal panel. In a playback mode for playing back a stereoscopic image (3D images) on the basis of images from a plurality of standpoints (parallax images), the display section 30 displays the parallax images read out from the external recording section 28, and allows a user to stereoscopically view the images. Meanwhile, examples of a device for playing back a stereoscopic image on the display section 30 include, but are not limited to the lenticular lens. For example, so-called parallax barrier system can be applied to the display section 30. The parallax barrier system controls the display section 30 to alternately repeat a process for displaying an image for a left eye of a user, which is made by the parallax images, on the color liquid crystal panel and emitting the panel by a backlight so that the light emitted by the backlight reaches only for the left eye of the user by using a parallax barrier, and a process for displaying an image for a right eye of the user, which is made by the parallax images, on the panel and emitting the panel by the backlight so that the light emitted by the backlight reaches only for the right eye of the user by using the parallax barrier.

Figure 4A:
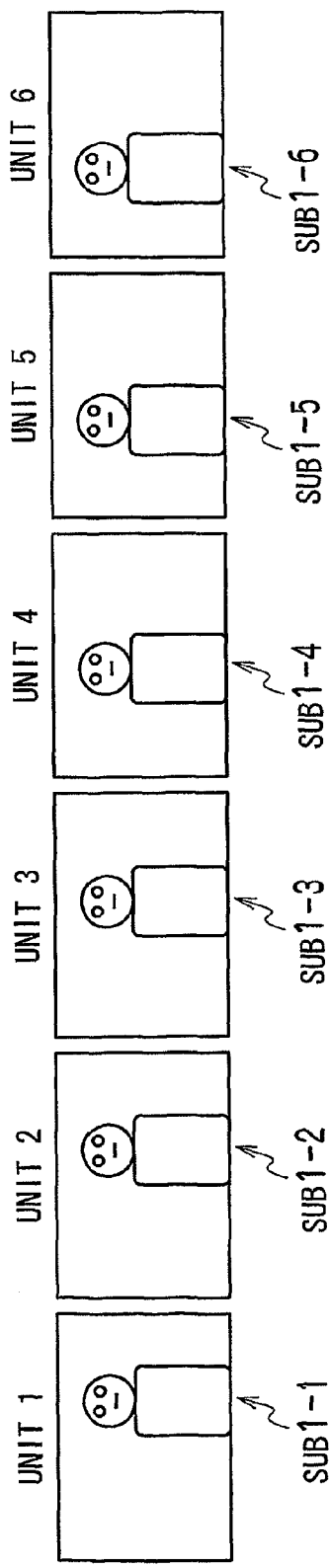
FIG. 4A is a diagram illustrating an example of ideal parallax images taken by the six imaging units.
Figure 4B:
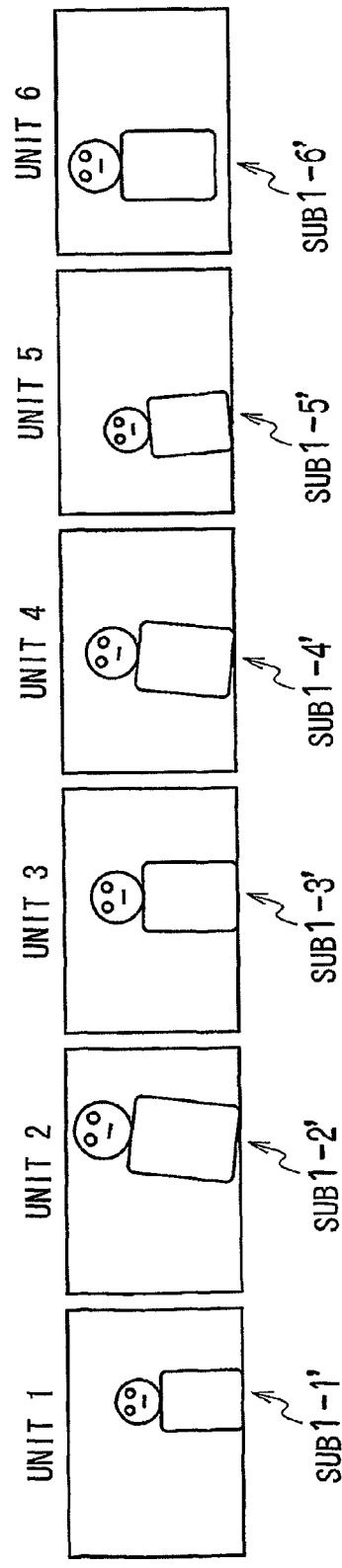
FIG. 4B is a diagram illustrating an example of actual parallax images taken by the six imaging units.

As shown in FIG. 4A, in an ideal case, the images SUB1-1 to SUB1-6 of the subject SUB1 only by the parallaxes between six images acquired by the imaging units 1 to 6 respectively. However, as shown in FIG. 4B, in an actual case, the images SUB1-1' to SUB1-6' of the subject SUB1 are displaced each other due to variations in attitudes and zoom factors of the imaging units 1 to 6 in addition to the parallaxes.

The images are transformed to correct the above-mentioned displacement concerning the subject by using the corresponding point detecting section 32, the geometrical transformation section 34 and the geometrical transformation parameter estimation section 36. A description related to a process for correcting the above-mentioned deviations will hereinafter be made with reference to a flowchart shown in FIG. 5.

<Overall Flow of Stereoscopic Image Processing>

Figure 5:
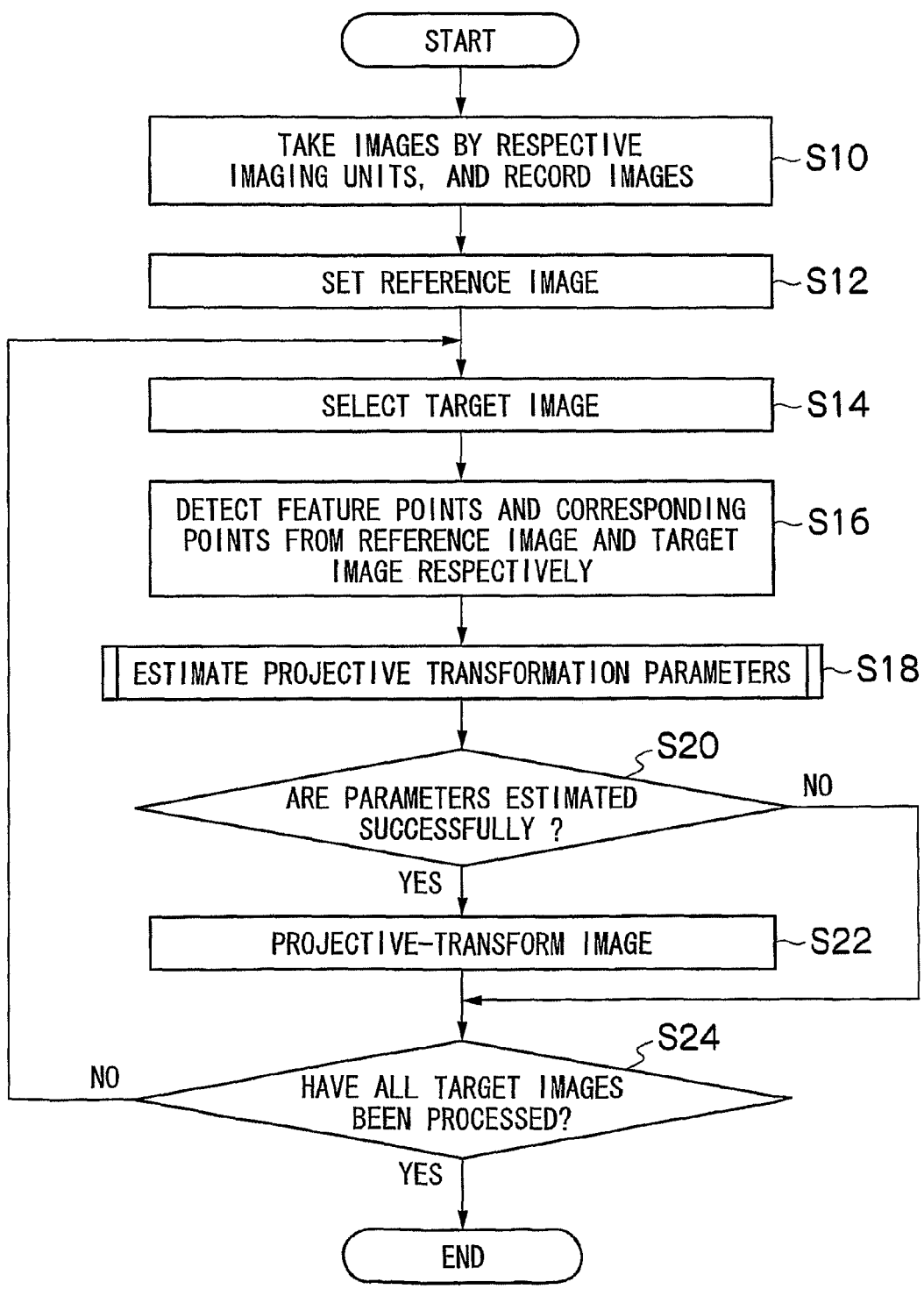
FIG. 5 is a flowchart illustrating a flow of a stereoscopic image processing according to an embodiment of the presently disclosed subject matter.

FIG. 5 is a flowchart illustrating a flow of a stereoscopic image processing according to an embodiment of the presently disclosed subject matter.

[Step S10]

When taking parallax images, six imaging units 1 to 6 take images on the identical subject, and the acquired six images are recorded. Here, each image is subjected to the above-mentioned various types of signal processing by the digital signal processing section 22, and subsequently, is temporarily stored in the main memory 20. Instead, it is also preferable that the external recording section 28 records the image into the external recording medium.

[Step S12]

A prescribed one image (image acquired by the imaging unit 3 in this embodiment) among the six images stored in the main memory 20 is set as a reference image. The set reference image is read from the main memory 20. Although the image acquired by the imaging unit 3 is set as the reference image in this embodiment, it does not mean any limitation. Instead, any image among the six images can be set as the reference image.

[Step S14]

The prescribed one image is selected among the five images other than the reference image as a target image. The selected target image is read from the main memory 20.

[Step S16]

The corresponding point detecting section 32 detects a plurality of pairs of corresponding points whose features are substantially identical to each other with respect to the above-mentioned set reference image and the selected target images.

Conventionally, various methods have been proposed as the detection method of the corresponding points. Conventional arts such as a block matching method, a KLT method (Tomasi & Kanade, 1991, Detection and Tracking of Point Features), SIFT (Scale Invariant Feature Transform) and the like can be used as the detection method.

In this embodiment, for convenience sake, the corresponding point detected from the reference image among the pairs of corresponding points detected by the corresponding point detecting section 32 is referred to as a feature point.

[Step S18]

The geometrical transformation parameter estimation section 36 estimates and calculates a projective transformation parameter on the basis of the coordinate values of the plurality pairs of the feature point and the corresponding point. The details on the step S18 will hereinafter be described.

[Step S20]

The CPU 12 determines whether or not the projective transformation parameter is estimated successfully. When the parameter is estimated successfully (in a case of "yes"), transition to step S22 is made. When the parameter is estimated unsuccessfully (in a case of "no"), step S22 is skipped and transition to step S24 is made.

[Step S22]

The geometrical transformation section 34 projective-transforms the target image on the basis of the projective transformation parameter having been estimated successfully. The projective-transformed image is recorded by the external recording section 28 into the external recording medium.

[Step S24]

The CPU 12 determines whether or not the processing of the above-mentioned steps S14 to S22 between the above-mentioned reference image and each of the five target images. When the processing is not finished, transition to step S14 is made and selection of another target image is performed in the step. When the processing is finished, this stereoscopic image processing is finished.

<Flow of Estimating Projective Transformation Parameter>

Next, a procedure for estimating the projective transformation parameter on the basis of the plurality pairs of the feature point and the corresponding point will be described.

Here, projective transformation equations are as follows:

$X=(ax+by+s)/(px+qy+1)$ $Y=(cx+dy+t)/(px+qy+1)$ [Expression 1]

The projective transformation parameters are represented as eight parameters: a, b, s, c, d, t, p and q in [Expression 1]. (x, y) and (X, Y) represent coordinate values before and after the projective transformation, respectively.

Figure 6A:
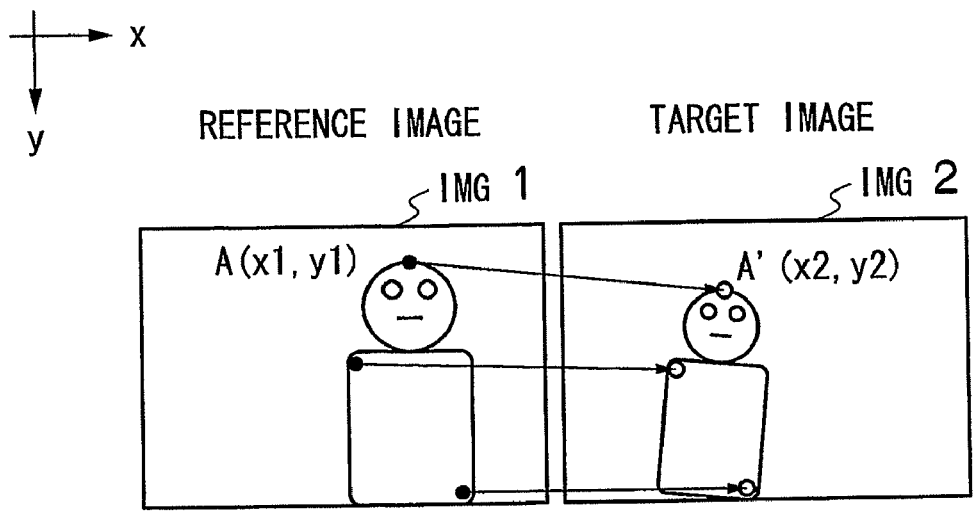
FIG. 6A is a diagram illustrating a correspondence relationship between feature points in a reference image and corresponding points in a target image.

In FIG. 6A, the feature points (solid dots) extracted from the reference image IMG1 are superimposed onto the reference image IMG1. Also, the corresponding points (open dots) detected from the target image IMG2 are superimposed onto the target image IMG2.

Figure 6B:
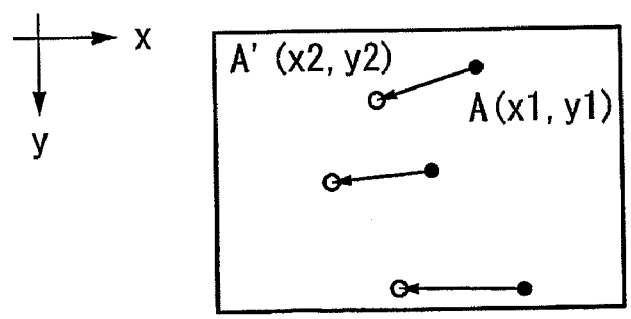
FIG. 6B is a diagram illustrating a vector connecting a feature point and a corresponding point corresponding to the feature point.

FIG. 6B illustrates vectors connecting the feature points and the respective corresponding points. In FIG. 6B, the feature point A (x1, y1) and the corresponding point A' (x2, y2) represent a certain pair of the feature point and the corresponding point.

Intrinsically, the feature point A and the corresponding point A' should have the same height (i.e. the y coordinate values are substantially the same as each other). However, since the subject in the reference image IMG1 and the target image IMG2 is displaced due to variations in attitudes and zoom factors of the imaging units 1 to 6, the heights (y coordinate values) of the feature point A and the corresponding point A' are not identical to each other.

Thus, when estimating the projective transformation parameter, this embodiment provides with a constraint that a line segment (hereinafter referred to as "vector") connecting the feature point A and the corresponding point A' becomes substantially horizontal (i.e. y coordinate values of the feature point A and the corresponding point A' are substantially identical to each other). This constraint is based on a fact that the six imaging units 1 to 6 are disposed horizontally to the main body 11 of the apparatus 10. If a plurality of imaging units are vertically disposed, an assumption that the vectors are vertical is required (i.e. x coordinate values of the feature point and the corresponding point are substantially identical to each other). In other words, a constraint that coordinate values along a direction orthogonal to parallaxes of the plurality of viewpoints are substantially identical with each other is provided.

Figure 7A:
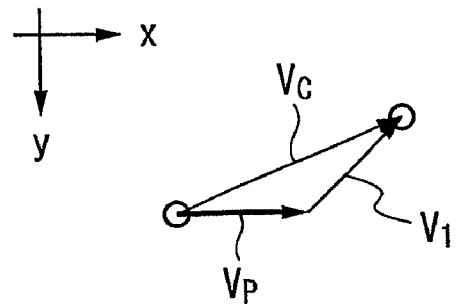
FIG. 7A is a diagram illustrating a vector connecting the feature point and the corresponding point and vector components thereof.
Figure 7B:
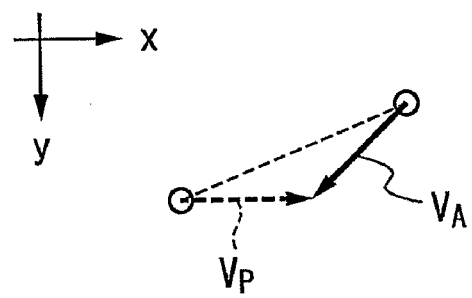
FIG. 7B is a diagram illustrating an embodiment of estimating method of estimating a projective transformation parameter.
Figure 7C:
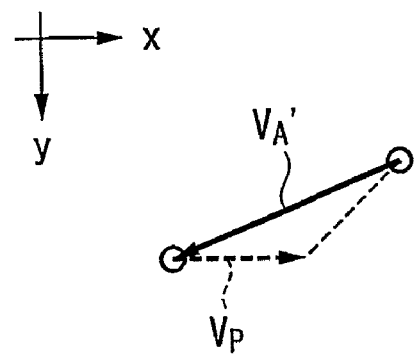
FIG. 7C is a diagram illustrating a comparative example.

FIG. 7A is a diagram illustrating a vector connecting the feature point and the corresponding point and vector components thereof. FIG. 7B is a diagram illustrating an embodiment of estimating method of estimating a projective transformation parameter. FIG. 7C is a diagram illustrating a comparative example.

As shown in FIG. 7A, the vector (combined vector $V_C$ in FIG. 7A) connecting the feature point and the corresponding point can be separated into a plurality of vector components. The vector components represent some factor which causes a displacement between the feature point and the corresponding point, and include "parallax" and "factors other than the parallax such as a variation in attitude of the imaging unit and the like". In FIG. 7A, a vector $V_P$ represents a vector component corresponding to the parallax, and a vector $V_1$ represents a vector component corresponding to the factors other than parallax including the variation in attitude of the imaging unit 1 to 6. As understood from the FIG. 7A, the y component of the combined vector $V_C$ does not depend on the vector component corresponding to the parallax, and the y component of the combined vector $V_C$ only depend on the factors other than the parallax.

As shown in FIG. 7C, when the target image IMG2 is projective-transformed so that the feature point and the corresponding point are substantially identical with each other, by a correction vector $V_A'$ ($\approx -V_C$), the combined vector in the projective-transformed image becomes zero.

Thus, the presently disclosed subject matter estimates and calculates the ideal projective transformation parameter related to the factors other than the parallax including the variation in camera attitude of the imaging unit 1 to 6 based on the y component of the vector $V_C$. As shown in FIG. 7B, when the target image IMG2 is projective-transformed so as to eliminate the vector component related to the factors other than the parallax by a correction vector $V_A$ ($\approx -V_1$), the combined vector in the projective-transformed image only include the vector component $V_P$ related to the parallax.

<Processing Flow of Projective Transformation Parameter>

Figure 8:
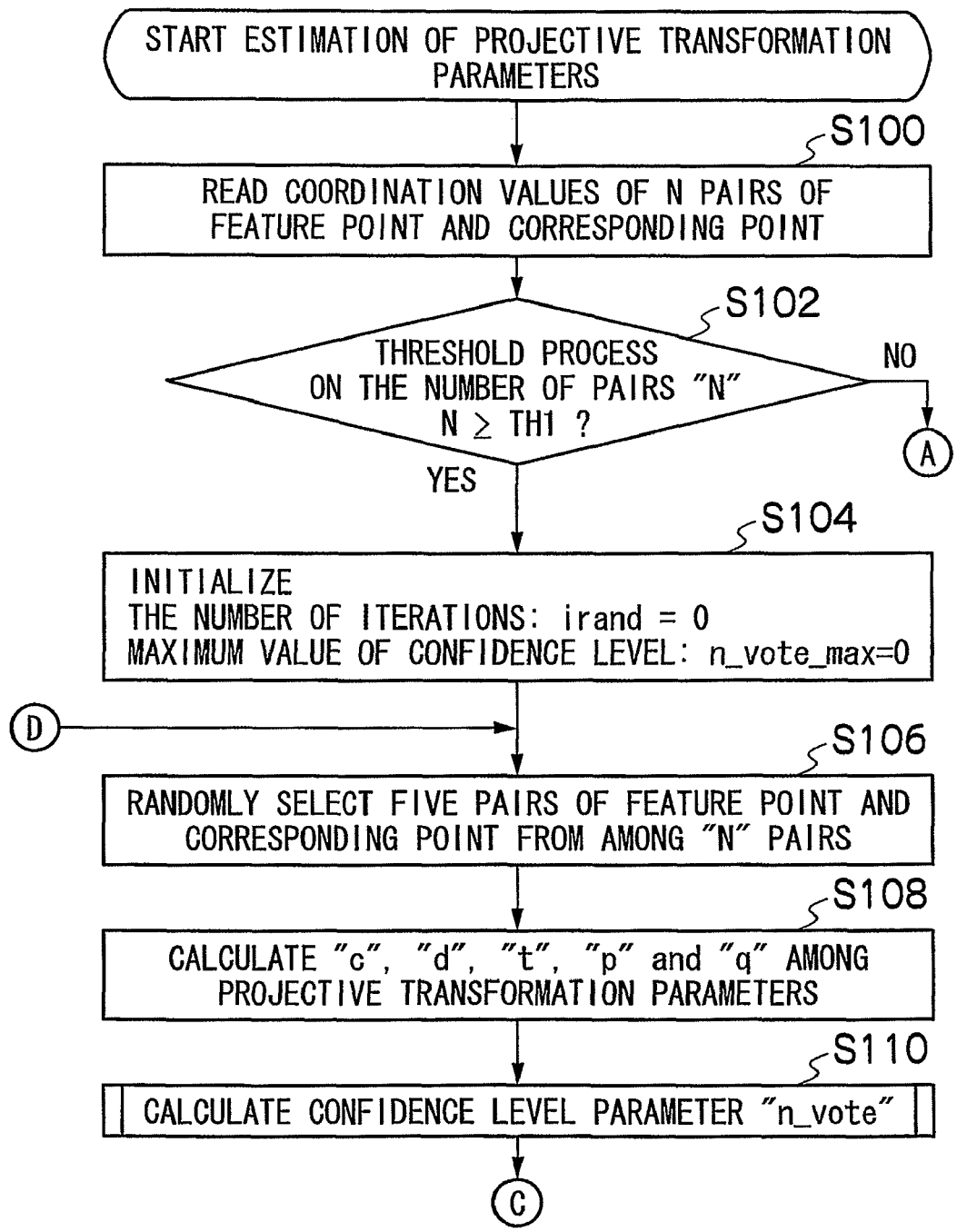
FIG. 8 is a flowchart illustrating an embodiment of a procedure for estimating a projective transformation parameter (No. 1)
Figure 9:
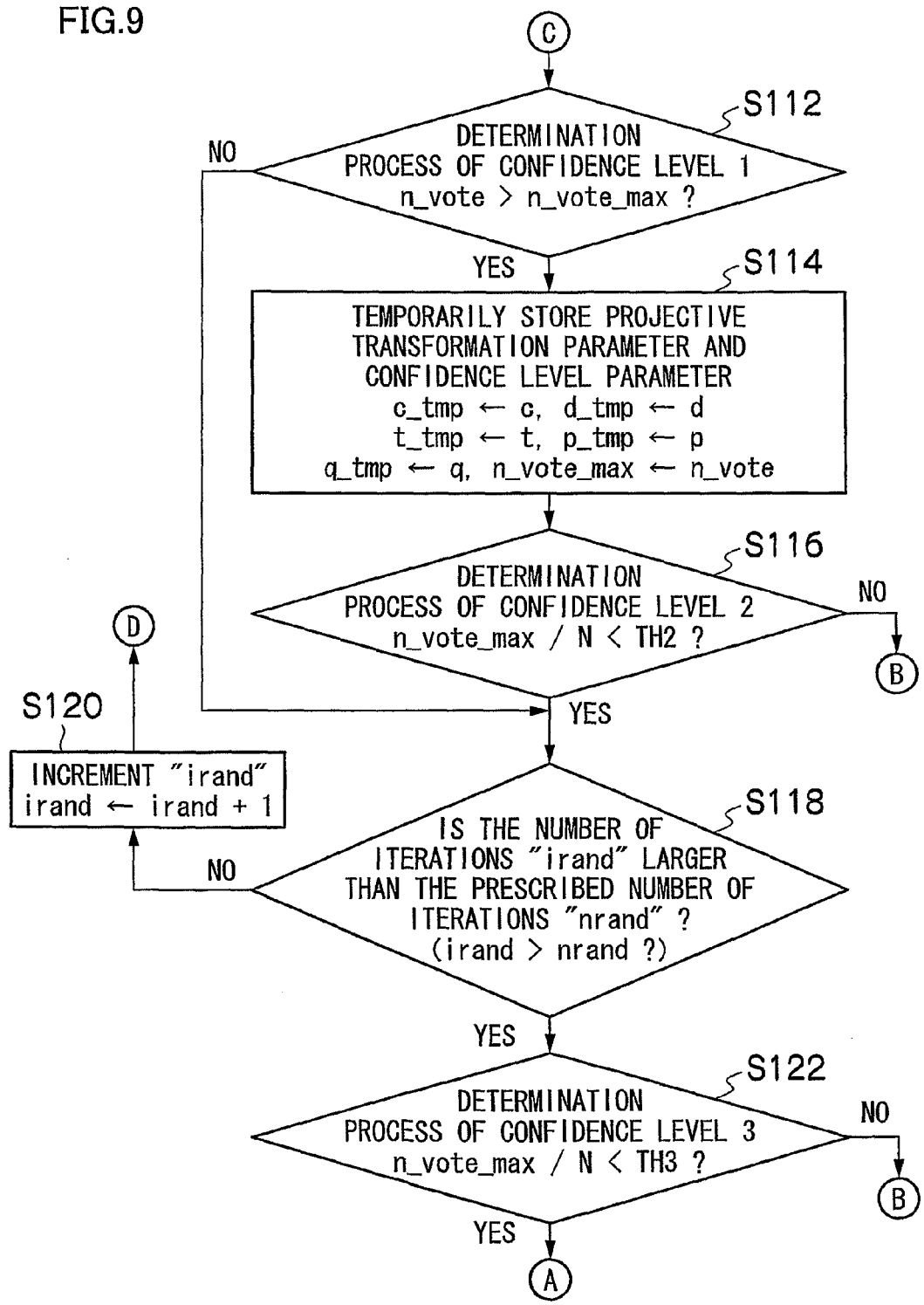
FIG. 9 is a flowchart illustrating the embodiment of the procedure for estimating the projective transformation parameter (No. 2)
Figure 10:
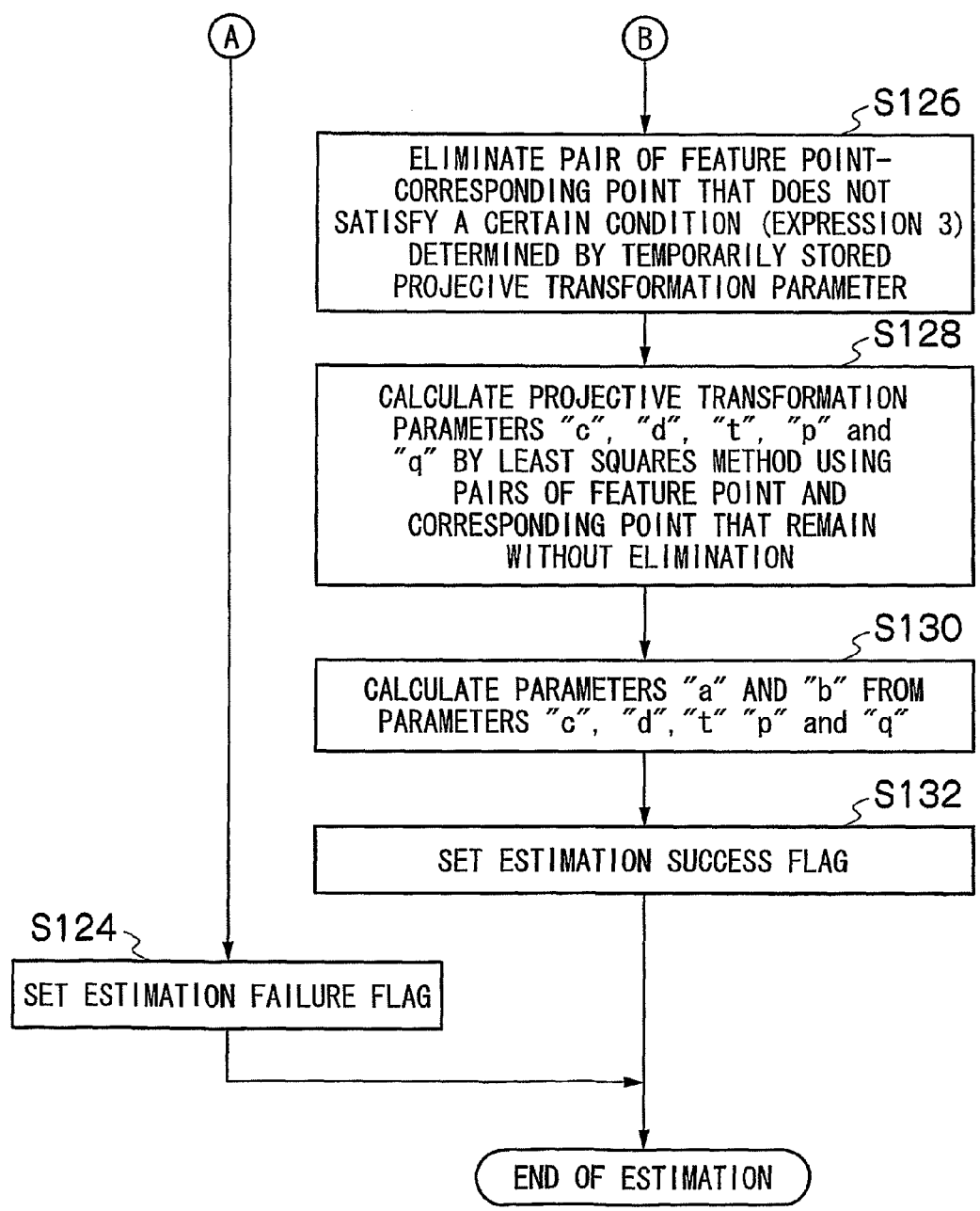
FIG. 10 is a flowchart illustrating the embodiment of the procedure for estimating the projective transformation parameter (No. 3)

FIGS. 8 to 10 are flowcharts illustrating an embodiment of a procedure for estimating a projective transformation parameter

[Step S100]

Provided that the number of all pairs of the feature points extracted from the reference image IMG1 and the corresponding points which are detected in the target image IMG2, and correspond to the respective feature points is N, the N pairs of the coordinates (x, y) of the feature points and the coordinates (X, Y) of the corresponding points are read. It is also provided that the coordinate of the feature point in an i-th ($1 \leq i \leq N$) pair is (xi, yi) and the coordinate of corresponding point thereof is (Xi, Yi).

[Step S102]

Since the projective transformation parameter cannot be estimated when the number of pairs N of the feature points and the corresponding points acquired by the corresponding point detecting section 32 is small, a threshold process on the number of pairs N is performed.

More specifically, a threshold value TH1 on the number of pairs N of the feature points and the corresponding points is provided, and following determination process is performed.

IF N<TH1 then A flag indicating that the estimation of the parameter fails is set, and the estimation is finished (step S124 in FIG. 10).

ELSE then The estimation of the parameter is continued.

In the embodiment, at least five pairs of the coordinate values are required in order to estimate the projective transformation parameter. Therefore, the threshold value TH1 is a prescribed value of at least 5.

[Step S104]

The number of iterations "irand" and a maximum value "n_vote_max" of confidence level parameter are initialized (both of them are set to "0").

[Step S106]

Five pairs are randomly selected from among the N pairs of the feature point and the corresponding point. The random selection of the five pairs can be performed using random numbers.

[Step S108]

The projective transformation parameter for matching the y coordinates of the five pairs of the feature point and the corresponding point with each other is calculated on the basis of the coordinate values (the x and y coordinate values of the five feature points and y coordinate value of the five corresponding points) of the five pairs of the feature point and the corresponding point selected in step S106.

As shown in the above-mentioned equation [Expression 1], the projective transformation parameters with reference to the y direction are the five, or c, d, t, p and q. Accordingly, the parameters (c, d, t, p and q) can be calculated uniquely by solving simultaneous equations which are acquired by substituting the coordinate values of the five points for the equation [Expression 1].

[Step S110]

The all pair (N pair) of points are applied to the projective transformation equation [Expression 1] for which the above-mentioned calculated parameters (c, d, t, p and q) have been substituted, and the number "n_vote" of pair of points which satisfy a following conditional expression is counted.

Conditional Expression 1: $|Y_i - y_i'| < THY1$     [Expression 2]

where $y_i' = (cx_i + dy_i + t)/(px_i + qy_i + 1)$, THY1 is a prescribed constant (threshold).

The conditional expression 1 is used to determine whether or not the y coordinate values of another pair of the points are matched, on the basis of the projective transformation parameter determined from the five pairs of the points. More specifically, the value of "n_vote" represents how many vectors are horizontal among the N vectors. The larger the "n_vote" is, the higher the confidence level of the projective transformation parameter is. The parameter "n_vote" is referred to as a confidence level parameter hereinafter.

[Step S112]

The confidence level parameter "n_vote" calculated in step S110 and the maximum value "n_vote_max" of the confidence level parameter are compared (Determination Process of Confidence Level 1). When the confidence level parameter n_vote is larger than n_vote_max (n_vote>n_vote_max), transition to step S114 is made. When n_vote is equal to or smaller than n_vote_max (n_vote$\leq$n_vote_max), transition to step S118 is made.

[Step S114]

The calculated parameters (c, d, t, p and q) are temporarily stored as an intermediate parameters (c_tmp, d_tmp, t_tmp, p_tmp and q_tmp), and n_vote is temporarily stored as the maximum value n_vote_max.

When the projective parameters are estimated, the processing of steps S106 to S118 are iterated prescribed times "nrand" as will be described later. The present embodiment has an assumption that the parameters (c, d, t, p and q) corresponding to the largest n_vote has the highest confidence level. Thus, the confidence level parameter n_vote which is calculated by a previous calculation of steps S106 to S120 (the (irand−1)-th calculation) is stored as n_vote_max. When the confidence level parameter n_vote calculated by a last calculation is larger than the confidence level parameters calculated by the previous calculation, which is stored as n_vote_max, the above mentioned parameters (c_tmp, d_tmp, t_tmp, p_tmp, q_tmp and n_vote_max) are updated.

[Step S116]

A ratio of the maximum value n_vote_max of the confidence level parameter to the number N of all pairs (n_vote_max/N) is acquired, and a threshold process on the ratio is performed (Determination Process of Confidence Level 2).

More specifically, a following process is performed on the basis of a prescribed threshold TH2.

IF n_vote_max/N<TH2 then The process for estimating the projective transformation parameters is continued.

ELSE then The iteration of the process for estimating the parameter is finished, and transition is made for calculating a final projective transformation parameter (step S126 in FIG. 10).

The above-mentioned threshold TH2 can be set as a value close to "1" but smaller than "1".

The maximum value n_vote_max of the confidence level parameter is the number of pairs of points whose y coordinate values are substantially identical to each other by the projective transformation performed by using the estimated projective transformation parameters among the N pairs of points. Accordingly, n_vote_max/N represents a ratio of the number of points to be appropriately corrected to the number of pairs of the all points N. Therefore, when n_vote_max/N is equal to or larger than TH2, the estimated projective transformation parameters are sufficiently confident, and the iteration of the process for estimating the parameters is finished. Transition to calculation of the final project transformation parameters is made. On the other hand, when n_vote_max/N is less than TH2, the iteration of the process for estimating the parameter is continued.

[Step S118]

It is determined whether or not the number of iterations irand is larger than the prescribed number nrand. When the number of iterations irand is less than or equal to the prescribed number nrand (in a case of "no"), transition to step S120 is made. When the number of iterations is larger than the prescribed number nrand ("in a case of yes"), transition to step S122 is made. The prescribed number nrand depends on the number of pairs N of the feature points and the corresponding points in the image. The prescribed number nrand is about 1000 to 10000.

[Step S120]

The number of iterations irand is incremented by one, and transition to step S106 is made.

[Step S122]

When the number of iterations irand is larger than the prescribed number nrand, a ratio of the maximum value (n_vote_max) of the confidence level parameter having been stored in step S114 to the number of all pairs N (n_vote_max/N) is acquired, and the threshold process is performed on this ratio (Determination Process of Confidence Level 3).

More specifically, the following process is performed using the prescribed threshold TH3.

IF n_vote_max/N<TH3 then A flag that indicates which the estimation of the projective transformation parameters fails is set, and the process of the estimation is finished (step S124 in FIG. 10).

ELSE then The iteration of the process for estimating the parameters is finished, and transition to a step for calculating the final projective transformation parameters (step S126 in FIG. 10) is made.

Needless to say, the threshold TH3 is less than the threshold TH2 in step S114.

[Step S124 (FIG. 10)]

As described above, when the number of pairs N of the feature points and the corresponding points is less than the threshold value TH1 (step S102), or when the confidence level of the estimated parameters is low (n_vote_max/N<TH3), an estimation failure flag indicating which estimation of the projective transformation parameters has failed is set, and the estimation of the projective transformation parameter is finished.

[Step S126]

The intermediate parameters (c_tmp, d_tmp, t_tmp, p_tmp and q_tmp) stored in step S114 are substituted for the projective transformation equations. The coordinate of all pairs of the points (N pairs) are substituted for the projective transformation equations, and only the pairs which satisfy a following conditional expression 2 are kept (the pairs which do not satisfy the conditional expression 2 are excluded).

Conditional Expression 2: $|Y_i - y_i'| < THY2$ [Expression 3]

where $y_i' = (c\_tmp \times x_i + d\_tmp \times y_i + t\_tmp)/(p\_tmp \times x_i + q\_tmp \times y_i + 1)$, and THY2 is a predetermined constant (threshold).

Thus, only the pairs of the feature point and the corresponding point whose confidence levels are high can be kept.

[Step S128]

The final estimation of the parameters is performed by means of a least squares method using only the pairs of the points satisfying the above-mentioned conditional expression 2. Here, provided that the number of the pairs of the points satisfying the conditional expression 2 is "n", the parameters are estimated by the least squares method so as to minimize an evaluation function "J2" in a following expression.

$$J_1 = \sum_{i=1}^{n} \{Y_i - y_i'\}^2$$ [Expression 4]

$$= \sum_{i=1}^{n} \{Y_i - (cx_i + dy_i + t)/(px_i + qy_i + 1)\}^2$$

$$J_2 = \sum_{i=1}^{n} \{px_i Y_i + qy_i Y_i + Y_i - cx_i - dy_i - t\}^2$$

The evaluation function "J2" is equivalent to an evaluation function "J1".

More specifically, as shown in following expressions, assuming that each of five expressions acquired by partially differentiating the evaluation function J2 with respect to each parameter (c, d, t, p and q) is "0", the parameters (c, d, t, p and q) are calculated by solving simultaneous equations composed of these five expressions acquires.

$$\frac{\partial J}{\partial c} = \quad \text{[Expression 5]}$$

$$-2\sum_{i=1}^{n}(px_i^2 Y_i + qx_i y_i Y_i + x_i Y_i - cx_i^2 - dx_i y_i - tx_i) = 0$$

$$\frac{\partial J}{\partial d} =$$

$$-2\sum_{i=1}^{n}(px_i y_i Y_i + qy_i^2 Y_i + y_i Y_i - cx_i y_i - dy_i^2 - ty_i) = 0$$

$$\frac{\partial J}{\partial t} = -2\sum_{i=1}^{n}(px_i Y_i + qy_i Y_i + Y_i - cx_i - dy_i - t) = 0$$

$$\frac{\partial J}{\partial p} =$$

$$2\sum_{i=1}^{n}(px_i^2 Y_i^2 + qx_i y_i Y_i^2 + x_i Y_i^2 - cx_i^2 Y_i - dx_i y_i Y_i - tx_i Y_i) = 0$$

$$\frac{\partial J}{\partial q} =$$

$$2\sum_{i=1}^{n}(px_i y_i Y_i^2 + qy_i^2 Y_i^2 + y_i Y_i^2 - cx_i y_i Y_i - dy_i^2 Y_i - ty_i Y_i) = 0$$

The final parameters (c, d, t, p and q) are calculated by solving the above simultaneous expression.

[Step S130]

Next, the residual parameters (a, b and s) among the eight projective transformation parameters (a, b, s, c, d, t, p and q) are determined. The residual parameters (a, b and s) are required to determine projective-transformed x coordinate values, other than the above-mentioned estimated parameters (c, d, t, p and q).

Here, the parameter "s" corresponds to the amount of displacement along the x direction (direction along which the parallax arises). Since the amount of parallax is unknown and "s" cannot be uniquely determined, then "s" is assumed to be s=0.

On the other hand, calculation of the parameters "a" and "b", for instance, is performed as follows.

Figure 11:
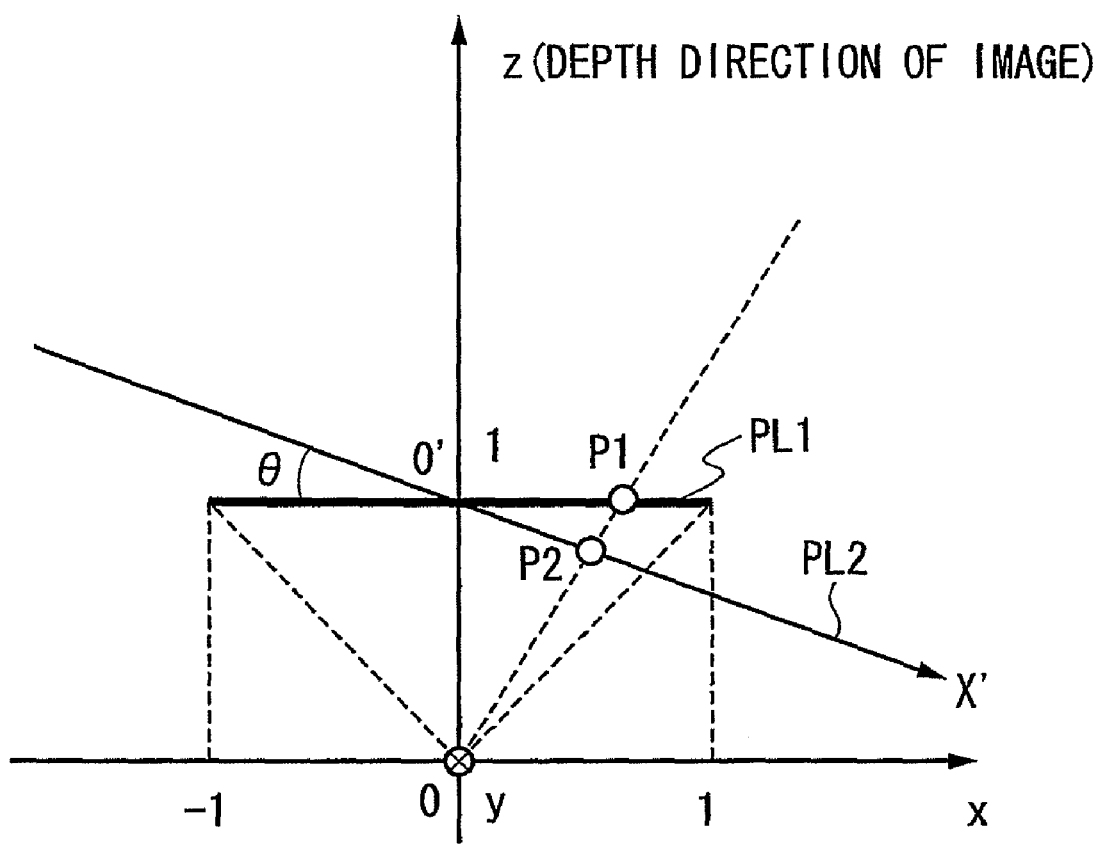
FIG. 11 is a diagram illustrating a procedure for determining other parameters required for determining an x coordinate value after the projective transformation among the projective transformation parameters.
Figure 12A:
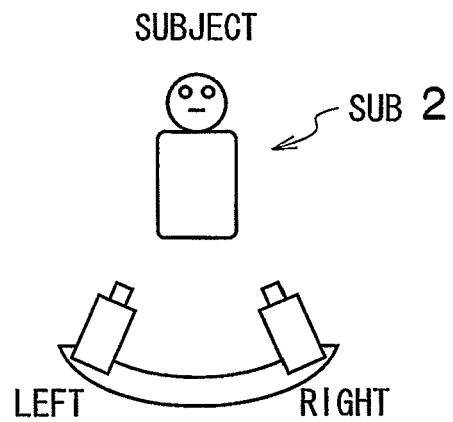
FIG. 12A is a diagram illustrating an example of a disposition of two imaging units (left and right) and a subject.
Figure 12B:
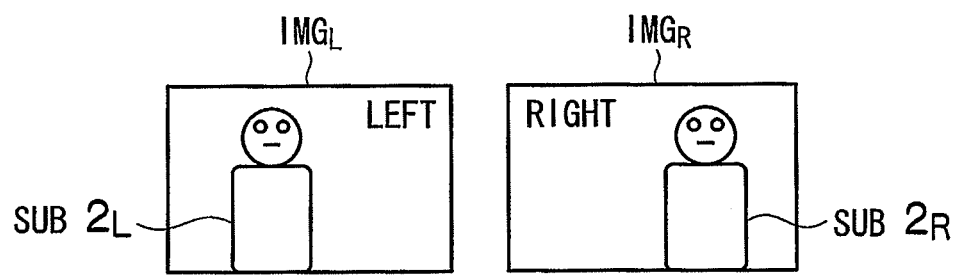
FIG. 12B is a diagram illustrating an example of ideal parallax images.
Figure 12C:
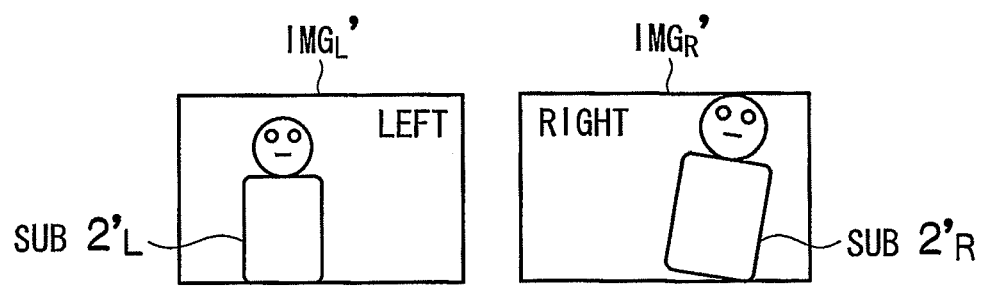
FIG. 12C is a diagram illustrating a deviation between the images due to camera attitudes of the imaging units.

Here, assuming that a coordinate system as shown in FIG. 11, it is provided that an image plane PL1 is disposed at a distance of "1" from the origin "O", each point on the image plane is projected onto the projecting plane PL2. In other words, a point P1 is moved to a point P2.

Here, it is provided that the angle between the image plane PL1 and the projecting plane PL2 is "θ", and the projecting plane PL2 is on the x' axis. It is also provided that the point of intersection between the projecting plane and the z axis (direction corresponding to the depth dimension with respect to the image) is O', which is determined to be the origin on the x' axis.

Provided that the x coordinate value of P1 is "x" and the x coordinate value of P2 with respect to x' axis is x', a following expression is acquired.

$$x' = \frac{x/\cos\theta}{\tan\theta x + 1} \quad \text{[Expression 6]}$$

In order to generalizing the [Expression 6], assuming that the angle between the projecting plane PL1 and the x axis is "$\theta_x$", and the angle between the projective plane PL2 and the y axis (axis along a direction orthogonal to the paper plane in FIG. 11) be "$\theta_y$", a following equations are acquired.

$$x' = \frac{x/\cos\theta_x}{\frac{\tan\theta_x}{w}x + \frac{\tan\theta_y}{h}y + 1} \quad \text{[Expression 7]}$$

$$y' = \frac{y/\cos\theta_y}{\frac{\tan\theta_x}{w}x + \frac{\tan\theta_y}{h}y + 1}$$

In the above-mentioned equations [Expression 7], (x, y) represents coordinate values on the image plane PL1, and (x', y') represents coordinate values on the projecting plane PL2. Parameters "w" and "h" represent the width and the height of the image, respectively, and are normalized with respect to the width and the height of the image. This operation corresponds to adjustment of the direction of the optical axis of the imaging unit.

Subsequently, an image projected onto the projecting plane is subjected to rotation, scale-changing and translation (parallel displacement). This operation corresponds to adjustment of the zoom factor of the imaging unit and the rotation of the optical axis of the imaging unit. Here, provided that the angle of rotation is $\theta_O$, the scale-changing rate due to zooming is "k", and the amount of translation is (s', t'), following expressions are acquired.

$$X = k\cos\theta_O \cdot x' - k\sin\theta_O \cdot y' + s'$$

$$Y = k\sin\theta_O \cdot x' + k\sin\theta_O \cdot y' + t' \quad \text{[Expression 8]}$$

When the equations [Expression 7] are substituted for the equations [Expression 8], the following equations are acquired.

$$X = \frac{\left(\frac{k\cos\theta_0}{\cos\theta_x} + \frac{s'}{w}\tan\theta_x\right) \cdot x + \left(-\frac{k\sin\theta_0}{\cos\theta_y} + \frac{s'}{h}\tan\theta_y\right) \cdot y + s'}{\frac{\tan\theta_x}{w}x + \frac{\tan\theta_y}{h}y + 1} \quad \text{[Expression 9]}$$

$$Y = \frac{\left(\frac{k\sin\theta_0}{\cos\theta_x} + \frac{t'}{w}\tan\theta_x\right) \cdot x + \left(-\frac{k\cos\theta_0}{\cos\theta_y} + \frac{t'}{h}\tan\theta_y\right) \cdot y + t'}{\frac{\tan\theta_x}{w}x + \frac{\tan\theta_y}{h}y + 1}$$

A following relationship is derived by comparing the above described equations with the projective transformation equations (equations [Expression 1]).

$$a = \frac{k\cos\theta_0}{\cos\theta_x} + \frac{s'}{w}\tan\theta_x, \quad \text{[Expression 10]}$$

$$b = \frac{k\sin\theta_0}{\cos\theta_y} + \frac{s'}{h}\tan\theta_y, \quad s = s'$$

$$c = \frac{k\sin\theta_0}{\cos\theta_x} + \frac{t'}{w}\tan\theta_x,$$

-continued $$d = \frac{k\cos\theta_0}{\cos\theta_y} + \frac{t'}{h}\tan\theta_y, t = t'$$

$$p = \frac{\tan\theta_x}{w}, q = \frac{\tan\theta_y}{h}$$

Since parameters c, d, t, p and q have already been known in the above equations [Expression 10], $\theta_x$, $\theta_y$, $\theta_O$ and k can be determined from these expressions. In turn, parameters "a" and "b" are determined from these $\theta_x$, $\theta_y$, $\theta_O$ and k, where "a" and "b" are determined provided that s=s'=0.

[Step S132]

When the estimation and calculation of the eight projective transformation parameters (a, b, s, c, d, t, p and q) is completed according to the above procedure, an estimation success flag is set, and the estimation of the projective parameters are finished.

In this embodiment, only the pairs of the points satisfying the condition shown in the equation [Expression 3] are used, and the final parameters are estimated by means of the least squares method. However, without limitation to this, all the intermediate parameters can be used to estimate the final parameters.

<Other Points>

According to the above estimation method, the projective transformation parameters for projective-transforming the feature point are calculated. The acquired projective transformation parameters are parameters for transforming the reference image. Intrinsically, the parameters to be calculated are parameters for transforming the target image. The reason why the parameters for transforming the target image are not calculated directly will be described below.

Typically, when the inputted image is transformed and outputted, it is calculated where each pixel position of the outputted image is located on the inputted image. This is a typical method for avoiding generation of a region without data if it is calculated where each pixel position of the inputted image is located on the outputted image. In other words, the parameters required to transform the target image can be parameters for transforming the feature point in a practical situation.

Although the projective transformation is used as the method for geometrically transforming the image in this embodiment, a geometrical transformation such as the Helmert transformation and the affine transformation can be used. In this case, the estimation method is different from that in the case of the projective transformation to some extent. For instance, the Helmert transformation is represented as follows:

Helmert transformation: $X=ax-by+s$ $Y=bx+ay+t$ [Expression 11]

In the same way as the method for estimating the projective transformation parameters is adopted, it is applicable to alter calculation of the five parameters (c, d, t, p and q) to determine Y using the five pairs of the feature point and the corresponding point for estimating the parameters (a, b and t) to determine Y in the equations [Expression 11] using three pairs of the feature point and the corresponding point. If the estimation of the final parameters by the least squares method is performed, it is applicable to alter the evaluation function J for a following equation.

$$J = \sum_{i=1}^{n} \{Y_i - y'_i\}^2 = \sum_{i=1}^{n} \{Y_i - (bx_i + ay_i + t)\}^2 \quad \text{[Expression 12]}$$

In the Helmert transformation equations, "a" and "b" are included in the parameters for determining X. Accordingly, if the parameters for determining Y are estimated, the parameter for determining X is also estimated. The parameter "s", which is also the translational component with respect to X, can be considered that s=0, as with the projective transformation. When applying the geometrical transformation other than the projective transformation or the Helmert transformation, the parameters for the geometrical transformation can also be estimated in a similar manner.

The stereoscopic imaging apparatus of this embodiment is the compound eye camera including the six imaging units. The scope of the presently disclosed subject matter is not limited to the embodiment. The number of imaging units can be equal to or larger than two. Furthermore, the stereoscopic imaging apparatus of the presently disclosed subject matter is limited to the compound eye camera including the plurality of imaging units. The presently disclosed subject matter is also applicable for a camera system including a plurality of single eye cameras which are not provided on the one main body thereof.

Furthermore, the stereoscopic image processing according to the present invention is not limited to a case of being performed by the stereoscopic imaging apparatus. Instead, the process can be performed by a personal computer or the like which does not have a function of taking parallax images. In this case, a plurality of images (parallax images) taken by a conventional compound eye camera or the like may be inputted to the personal computer or the like, and the process may be performed on the personal computer or the like. A function of geometrical transformation for acquiring the ideal parallax images may be provided as a program which causes the personal computer to perform the above described process.

The presently disclosed subject matter is not limited to the above-mentioned embodiment and various modifications can be made without departing from the spirit of the presently disclosed subject matter.

REFERENCE SIGNS LIST 1 to 6 . . . imaging units; 10 . . . stereoscopic imaging apparatus; 12 . . . central processing unit (CPU); 20 . . . main memory; 22 . . . digital signal processing section; 28 . . . external recording section; 30 . . . displaying section; 32 . . . corresponding point detecting section; 34 . . . geometrical transformation section; and 36 . . . geometrical transformation parameter estimation section

The invention claimed is:

1. A stereoscopic image processing apparatus, comprising:
an image acquisition device for acquiring a plurality of images of an identical subject taken from a plurality of viewpoints;
a corresponding point detection device for selecting a prescribed image as a reference image from among the acquired plurality of images, selecting an image other than the reference image as a target image from among the acquired plurality of images, and detecting a plurality of feature points from the reference image and a plurality of corresponding points from the target image to generate a plurality of pairs of the feature point and corresponding point, wherein feature of the feature point and the corresponding point included in the same pair are substantially identical to each other;

a parameter estimation device for estimating geometrical transformation parameters for geometrically transforming the target image such that y coordinate values of the feature point and the corresponding point included in the same pair are substantially identical to each other, wherein y direction is orthogonal to a parallax direction of the plurality of viewpoints; and an image transformation device for geometrically transforming the target image on the basis of the estimated geometrical transformation parameters.

2. The stereoscopic image processing apparatus according to claim 1, wherein the parameter estimation device estimates at least some parameters in the geometrical transformation parameters based on at least the x and y coordinate values of the corresponding points and the y coordinate values of the feature points.

3. The stereoscopic image processing apparatus according to claim 2, wherein the parameter estimation device calculates parameters other than said some parameters estimated by the parameter estimation device based on said some parameters.

4. The stereoscopic image processing apparatus according to claim 2, wherein
the geometrical transformation parameters are a projective transformation parameters, and
the parameter estimation device selects five or more pairs from among the plurality of pairs of the feature point and the corresponding point, and estimates parameters for determining y coordinate values of projective-transformed corresponding points on the basis of the coordinate values the feature point and the corresponding point of each of the selected pairs.

5. The stereoscopic image processing apparatus according to claim 4, wherein the parameter estimation device calculates the other parameters required to determine the x coordinate values of the projective-transformed corresponding points on the basis of the parameters for determining y coordinate values of projective-transformed corresponding points.

6. The stereoscopic image processing apparatus according to claim 2, wherein
the geometrical transformation parameters are Helmert transformation parameters, and
the parameter estimation device selects three or more pairs from among the detected plurality of pairs of the feature point and the corresponding point, and estimates the Helmert transformation parameters on the basis of the coordinate values of the feature points and the corresponding points of each of the selected pairs.

7. A stereoscopic imaging apparatus, comprising:
a stereoscopic image processing device according to claim 1; and
a plurality of imaging units which are disposed at a plurality of viewpoints along the parallax direction respectively, and take images of the identical subject from their viewpoints, wherein
the image acquisition device acquires the plurality of images taken by the plurality of imaging units, respectively.

8. A stereoscopic image processing method, comprising:
an image acquisition step of acquiring a plurality of images of an identical subject taken from a plurality of viewpoints;
a corresponding point detection step of selecting a prescribed image as a reference image from among the acquired plurality of images, selecting an image other than the reference image as a target image from among the acquired plurality of images, and detecting a plurality of feature points from the reference image and a plurality of corresponding points from the target image to generate a plurality of pairs of the feature point and corresponding point, wherein feature of the feature point and the corresponding point included in the same pair are substantially identical to each other;

a parameter estimation step of estimating geometrical transformation parameters for geometrically transforming the target image such that y coordinate values of the feature points and the corresponding points included in the same pair are substantially identical to each other, wherein y direction is orthogonal to a parallax direction of the plurality of viewpoints; and an image transformation step of geometrically transforming the target image on the basis of the estimated geometrical transformation parameters.

9. The stereoscopic image processing method according to claim 8, wherein, in the parameter estimation step, at least some parameters in the geometrical transformation parameters are estimated based on at least the x and y coordinate values of the corresponding points and the y coordinate values of the feature points.

10. The stereoscopic image processing method according to claim 9, wherein the parameter estimation step includes:
a first step of randomly selecting a certain number of pairs required to estimate the geometrical transformation parameters for determining y coordinate values of the transformed corresponding points from among N pairs, provided that a total number of plurality of pairs is N;
a second step of calculating the y coordinate values of the transformed corresponding points with respect to each of the N pairs based on the parameter estimated on the basis of the coordinate values of each corresponding point randomly selected by the first step;
a third step of calculating a difference between the y coordinate value of the transformed corresponding point calculated by the second step and the y coordinate value of the feature point for each of the N pairs;
a fourth step of counting a number of pairs of the feature point and the corresponding point whose difference calculated by the third step is less than a predetermined first threshold;
a fifth step of determining a confidence level of the estimated parameter on the basis of a ratio between the counted number of pairs and the N; and
a step of iterating the first to fifth steps until the determined confidence level reaches a predetermined confidence level, or the number of iterations reaches a predetermined number of iterations.

11. The stereoscopic image processing method according to claim 10, wherein the parameter estimation step includes:
a sixth step of calculating the y coordinate value of the transformed corresponding point for each of the N pairs based on the estimated parameter when the determined confidence level reaches the predetermined confidence level or the estimated parameter when the confidence level is highest among the levels at the respective iterations;
a seventh step of calculating a difference between the y coordinate value of the transformed corresponding point calculated by the sixth step and the y coordinate value of the feature point for each of the N pairs;
an eighth step of selecting only the pairs of the feature point and the corresponding point whose difference calculated by the seventh step is less than a predetermined second threshold from the N pairs; and a ninth step of calculating the plurality of parameters using only the pairs of the feature point and the corresponding point selected in the eighth step.

12. The stereoscopic image processing method according to claim 11, wherein, in the ninth step, the plurality of parameters which minimize a square sum of differences between the y coordinate values of the transformed corresponding points in the plurality of pairs selected by the eighth step and the y coordinate values of the feature points.

13. A non-transitory computer-readable medium comprising a computer program causing a computer to execute a process for a stereoscopic image processing, the process comprising:

acquiring a plurality of images of an identical subject taken from a plurality of viewpoints;

selecting a prescribed image as a reference image from among the acquired plurality of images, selecting an image other than the reference image as a target image from among the acquired plurality of images, and detecting a plurality of feature points from the reference image and a plurality of corresponding points from the target image to generate a plurality of pairs of the feature points and corresponding points, wherein features of the feature points and the corresponding points included in the same pair are substantially identical to the feature points respectively;

estimating geometrical transformation parameters for geometrically transforming the target image such that y coordinate values of the feature points and the corresponding points included in the same pair are substantially identical to each other, wherein y direction is orthogonal to a parallax direction of the plurality of viewpoints; and geometrically transforming the target image on the basis of the estimated geometrical transformation parameters.

* * * * *